US012167752B2

(12) United States Patent
Weiss

(10) Patent No.: US 12,167,752 B2
(45) Date of Patent: Dec. 17, 2024

(54) DUAL VAPORIZER BATTERY DEVICE

(71) Applicant: Brett Weiss, Portland, OR (US)

(72) Inventor: Brett Weiss, Portland, OR (US)

(*) Notice: Subject to any disclaimer, the term of this patent is extended or adjusted under 35 U.S.C. 154(b) by 587 days.

(21) Appl. No.: 17/535,751

(22) Filed: Nov. 26, 2021

(65) Prior Publication Data

US 2022/0166102 A1 May 26, 2022

Related U.S. Application Data

(60) Provisional application No. 63/118,601, filed on Nov. 25, 2020.

(51) Int. Cl.
*A24F 40/30* (2020.01)
*A24F 40/40* (2020.01)
*H01M 50/213* (2021.01)
*H01M 50/247* (2021.01)
*H01M 50/269* (2021.01)

(52) U.S. Cl.
CPC ............ *A24F 40/30* (2020.01); *A24F 40/40* (2020.01); *H01M 50/213* (2021.01); *H01M 50/247* (2021.01); *H01M 50/269* (2021.01); *H01M 2220/30* (2013.01)

(58) Field of Classification Search
None
See application file for complete search history.

(56) References Cited

U.S. PATENT DOCUMENTS

| | | | |
|---|---|---|---|
| 7,296,909 B2* | 11/2007 | Van Deursen | F16M 13/04 362/208 |
| 10,111,468 B2* | 10/2018 | Fornarelli | H05B 3/44 |
| 2014/0060556 A1 | 3/2014 | Liu | |
| 2015/0164145 A1 | 6/2015 | Zhou | |
| 2016/0353800 A1 | 12/2016 | Carlo | |
| 2020/0164162 A1 | 5/2020 | Phillips et al. | |

* cited by examiner

*Primary Examiner* — Christopher M Rodd
*Assistant Examiner* — Daniel Edward Vakili
(74) *Attorney, Agent, or Firm* — Boudwin Intellectual Property Law; Daniel Boudwin

(57) ABSTRACT

A dual vaporizer battery device is provided. The device includes a first battery housing having a first end opposite a second end and a second battery housing having a proximal end opposite a distal end. A first battery is disposed within the first battery housing and a second battery is disposed within the second battery housing. The first end is pivotally affixed to the proximal end via a hinge. The first battery housing is selectively movable relative to the second battery housing between a linear configuration and a parallel configuration. The first battery housing is coaxial relative to the second battery housing when in the linear configuration. A connector is disposed on each of the second end and the distal end, wherein each connector removably secures a vaporizer housing thereto, such that each vaporizer housing is in operable communication with each of the first and second batteries.

20 Claims, 4 Drawing Sheets

DUAL VAPORIZER BATTERY DEVICE

CROSS REFERENCE TO RELATED APPLICATIONS

This application claims the benefit of U.S. Provisional Application No. 63/118,601 filed on Nov. 25, 2020. The above identified patent application is herein incorporated by reference in its entirety to provide continuity of disclosure.

BACKGROUND OF THE INVENTION

The present invention relates to vaporizer devices. More particularly, the present invention pertains to a pivotally affixed pair of battery housings removably securable to vaporizer housings, allowing a user to simultaneously operate two separate vaporizer housings.

Many individuals utilize vaporizer devices to inhale flavored vapor created when a vaporizer liquid is heated. Typically, such vaporizer devices include a battery to provide power to a heating element to vaporize the liquid stored within a reservoir. This configuration limits the user to having a singular cartridge or reservoir to store vaporizer liquid, forcing the user to empty the reservoir and refill it with a different liquid if a different vapor is desired. Alternately, the user must remove and replace the initial cartridge with a separate cartridge containing the desired liquid. Frequently changing the cartridge or liquid can be particularly inconvenient, as it requires the user to carry multiple separate cartridges which can each be easily misplaced.

Furthermore, individuals may want to experiment with inhaling a combination of two different vapors produced by distinct vaporizer fluids, often referred to as a hybrid vapor. As typical vaporizer systems are only capable of retaining a single vaporizer cartridge thereon, a user must purchase and operate two separate vaporizer systems to create a hybrid vapor. Often, each vaporizer system includes a separate control that must be actuated to initiate the heating element to vaporize the fluid within the reservoir. Operating two separate controls simultaneously can be difficult. Therefore, a singular device having a pair of separate battery housings that can each receive a vaporizer housing to facilitate inhalation of hybrid vapors is desired.

In light of the devices disclosed in the known art, it is submitted that the present invention substantially diverges in design elements from the known art and consequently it is clear that there is a need in the art for an improvement to existing vaporizer devices. In this regard, the instant invention substantially fulfills these needs.

SUMMARY OF THE INVENTION

In view of the foregoing disadvantages inherent in the known types of vaporizer devices now present in the known art, the present invention provides a vaporizer battery device wherein the same can be utilized for providing convenience for the user when simultaneously operating two distinct vaporizer cartridge housings.

The present system comprises a first battery housing having a first end opposite a second end and a second battery housing having a proximal end opposite a distal end. A first battery is disposed within the first battery housing and a second battery is disposed within the second battery housing. The first end of the first battery housing is pivotally affixed to the proximal end of the second battery housing via a hinge. The first battery housing is selectively movable relative to the second battery housing between a linear configuration and a parallel configuration, wherein the first battery housing is coaxially disposed relative to the second battery housing when in the linear configuration. A connector is disposed on each of the second end and the distal end, wherein each connector is configured to removably secure a vaporizer housing thereto, such that the vaporizer housing is in operable communication with one of the first battery and the second battery. In some embodiments, the system further comprises a first vaporizer housing having a first cartridge operably connected to a first heating element and a first mouthpiece, and a second vaporizer housing having a second cartridge operably connected to a second heating element and a second mouthpiece.

In some embodiments, the connector comprises a threaded interface configured to engage complementary threading disposed on a base of each vaporizer housing. In another embodiment, a magnet is disposed within each of the first end and the proximal end, such that the first end is magnetically secured to the proximal end when in the linear configuration. In other embodiments, the hinge comprises a cylindrical hinge. In yet another embodiment, the first battery housing abuts the second battery housing along an entire length thereof when in the parallel configuration. In some embodiments, each connector includes a pressure sensor configured to transfer power from each battery to each heating element of each vaporizer housing upon detection of suction at each mouthpiece of the vaporizer housing. In another embodiment, a charging port is disposed on each of the first battery housing and the second battery housing, wherein each charging port is in electrical communication with each of the first battery and the second battery. In other embodiments, the charging port is disposed on each of the second end and the distal end, such that the user can selectively affix a charging device to the connector to provide power to the first battery and the second battery. In yet another embodiment, the charging port is disposed on each of the proximal end and the first end. In some embodiments, the charging port comprises a micro-USB port.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figures 1A, 1B:
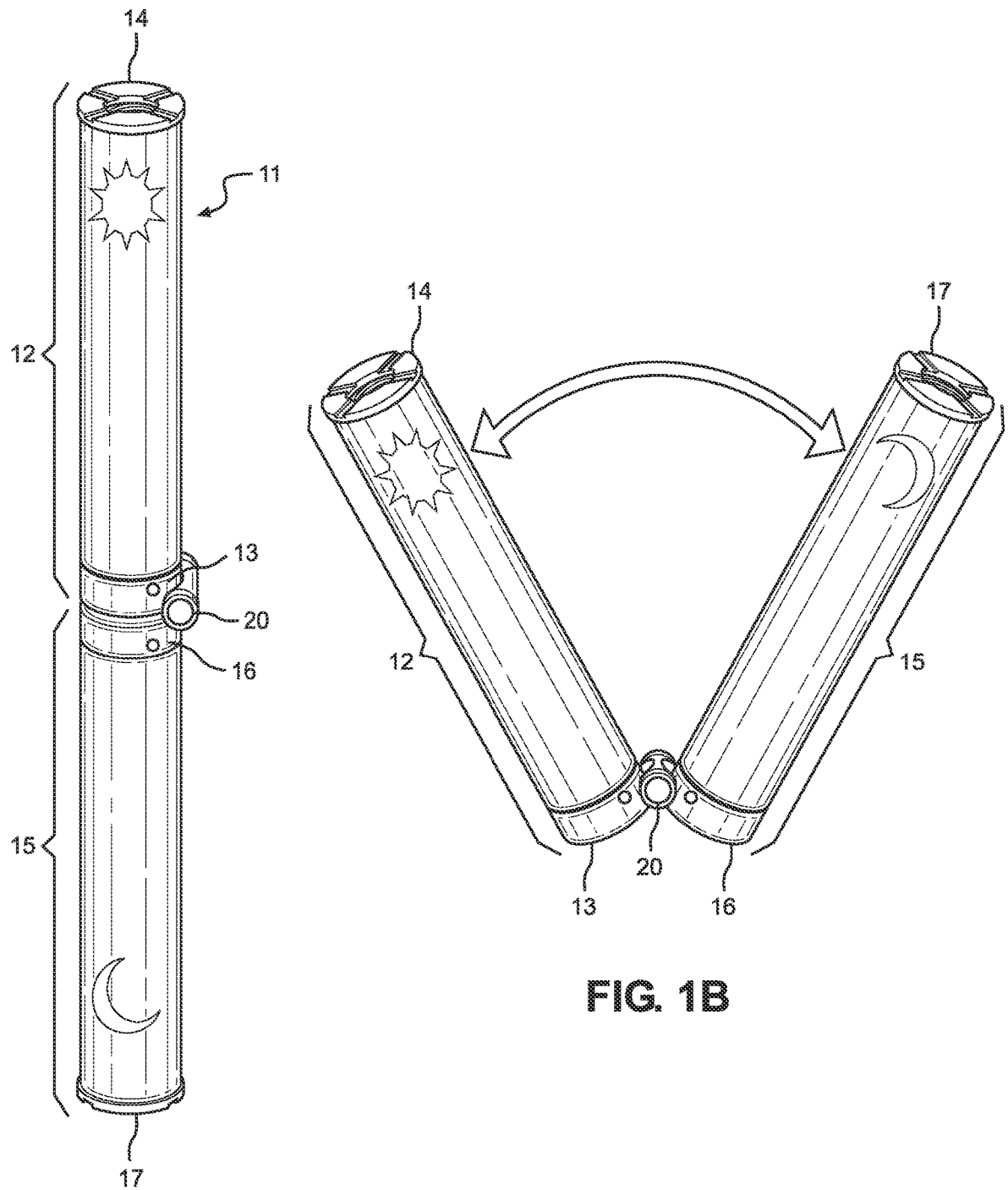
FIG. 1A shows a perspective view of an embodiment of the dual vaporizer battery device in a linear configuration.
FIG. 1B shows a perspective view of an embodiment of the dual vaporizer battery device in a transitional state between a linear configuration and a parallel configuration.

Reference is made herein to the attached drawings. Like reference numerals are used throughout the drawings to depict like or similar elements of the vaporizer battery device. The figures are intended for representative purposes only and should not be considered to be limiting in any respect.

Figure 3:
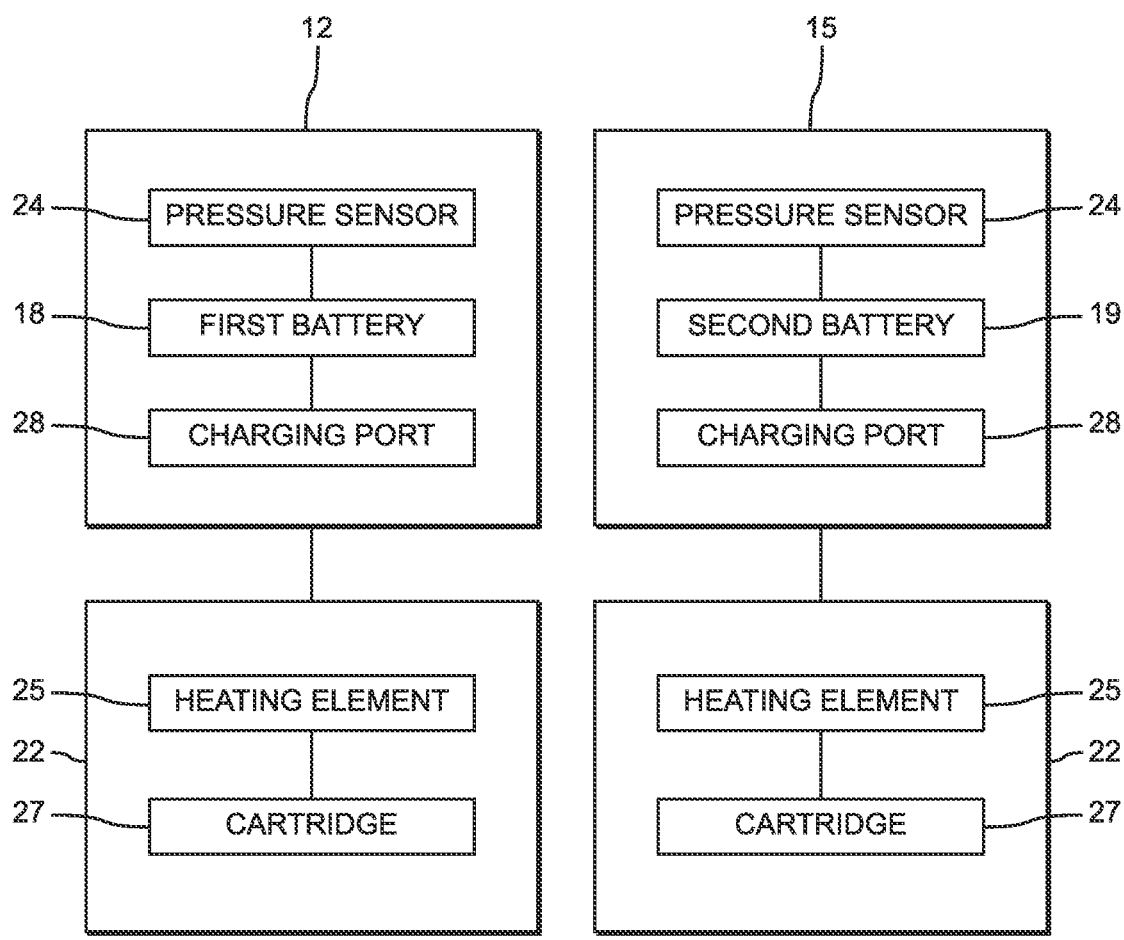
FIG. 3 shows a schematic view of an embodiment of the dual vaporizer battery device.
Figure 4:
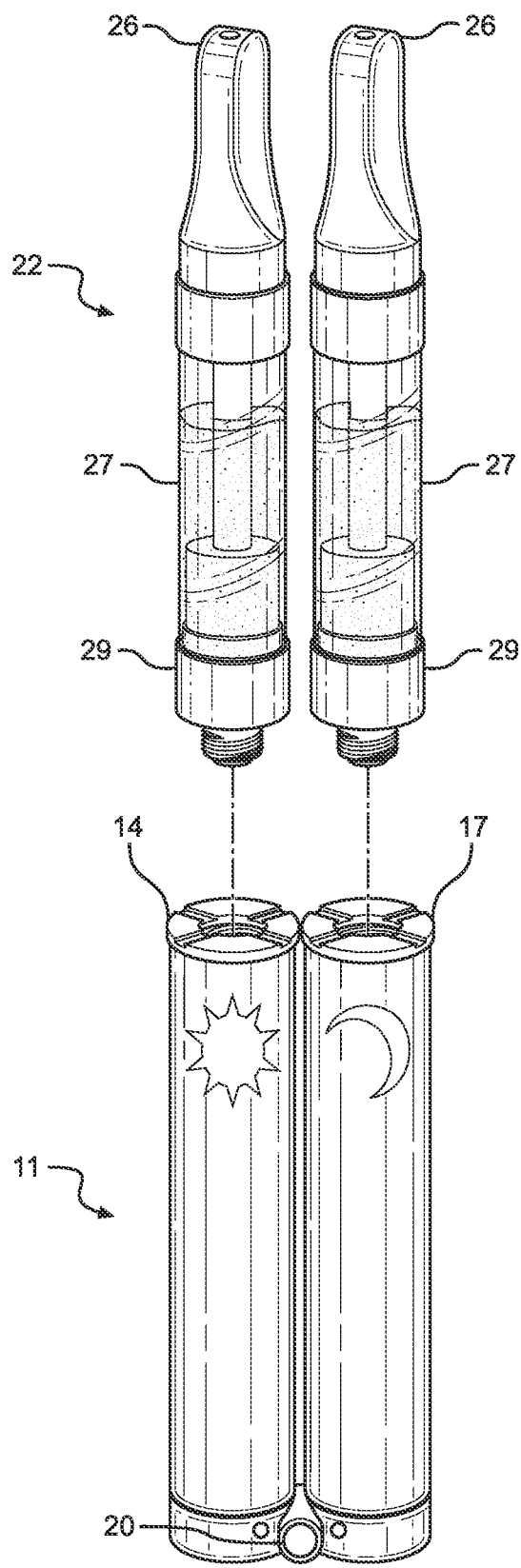
FIG. 4 shows an exploded view of an embodiment of the dual vaporizer battery device with associated vaporizer housings.

Referring now to FIGS. 1A and 1B, there is shown a perspective view of an embodiment of the dual vaporizer battery device in a linear configuration and a perspective view of an embodiment of the dual vaporizer battery device in a transitional state between a linear configuration and a parallel configuration, respectively. The dual vaporizer battery device 11 comprises a first battery housing 12 having a first battery (as shown in FIG. 3, 18) therein and a second battery housing 15 having a second battery (as shown in FIG. 3, 19) therein. In the shown embodiment, the first and second battery housings 12, 15 each comprise a unique indicium thereon, such that the user can readily distinguish between the first and second battery housings 12, 15 at a glance. In the shown embodiment, the unique indicium are proximate to a distal 17 end of the second battery housing 15 and a second end 14 of the first battery housing 12. A first end 13 of the first battery housing 12 is pivotally affixed to a proximal end 16 of the second battery housing 15 via a hinge 20, such that the dual vaporizer battery device 11 is selectively movable between a linear configuration (as shown in FIG. 1A) and a parallel configuration (as best illustrated in FIG. 4). In the linear configuration, the first battery housing 12 is coaxial with the second battery housing 15, such that vaporizer housings (as shown in FIG. 4, 22) affixed to each of the second end 14 and the distal end 17 are oriented opposite each other for independent use. Alternatively, in some embodiments, when in the parallel configuration the first and second battery housings 12, 15 abut each other along an entire length thereof, such that vaporizer housings affixed thereto are oriented in a same direction for simultaneous use. Once the vaporizer housings are affixed to each of the first and second battery housings 12, 15, the vaporizer housings are in electrical communication with each of the first and second batteries, respectively. In this manner, the user can simultaneously power two separate vaporizer housings to allow a user to have access to two distinct vaporizer fluids without requiring replacement of the fluid cartridges. In the illustrated embodiment, the hinge 20 comprises a cylindrical hinge having a length equal to a diameter of each of the first and second battery housings 12, 15. In some embodiments, the hinge 20 comprises a spherical hinge to facilitate an increased range of motion to allow the first and second battery housings 12, 15 rest parallel relative to each other in the parallel configuration. In such embodiments, the proximal end 16 and the first end 13 comprise a partially spherical cutout dimensioned to facilitate movement of each of the first and second battery housings 12, 15 about the hinge 20.

Figure 2A:
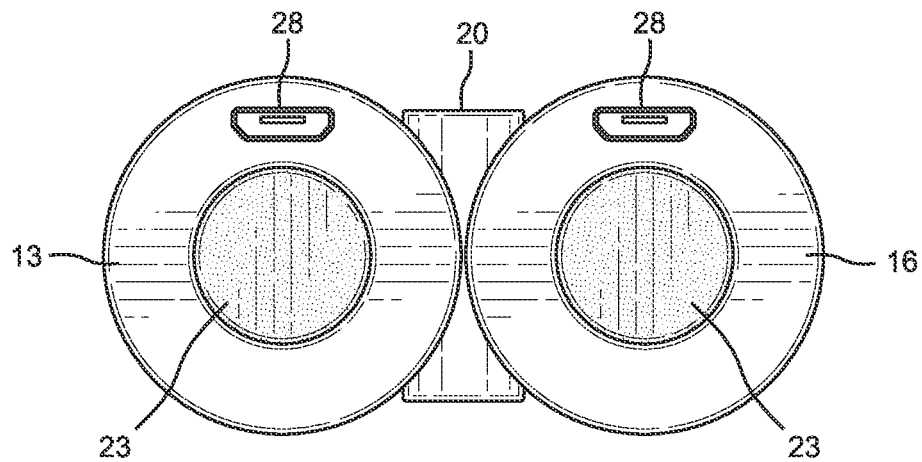
FIG. 2A shows an end view of the hinge of an embodiment of the dual vaporizer battery device.
Figure 2B:
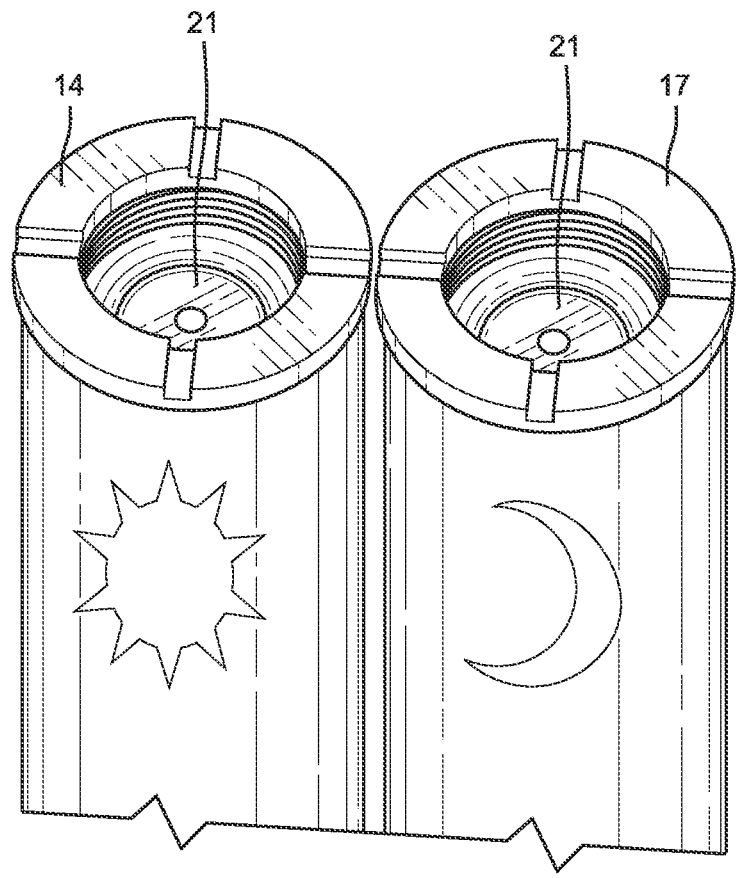
FIG. 2B shows an end view of the connectors of an embodiment of the dual vaporizer battery device.

Referring now to FIGS. 2A and 2B, there is shown an end view of the hinge of an embodiment of the dual vaporizer battery device and an end view of the connectors of an embodiment of the dual vaporizer battery device, respectively. In the shown embodiment of FIG. 2A, a magnet 23 is disposed in each of the first end 13 and the proximal end 16, wherein the first and proximal ends 13, 16 are removably securable to each other via the magnets 23. In this manner, the dual vaporizer battery device is retained in the linear configuration via the pair of magnets 23 to facilitate independent use of the vaporizer housings in the linear configuration until the user applies an external force to separate the magnets 23. Once the magnets 23 are separated, the user can freely pivot the dual vaporizer battery device about the hinge 20 to collapse the device into the parallel configuration. In the shown embodiment, the magnets 23 are disposed coaxially within the first and second battery housings, to evenly distribute the magnetic forces retaining the dual vaporizer battery device in the linear configuration across the cross-sectional area of each of the first end 13 and the proximal end 16.

In the illustrated embodiment of FIG. 2A, a charging port 28 is disposed on each of the first end 13 and the proximal end 16, wherein the charging port 28 operably connects an external power source to the first and second batteries, respectively. In this manner, the user can independently recharge the first and second batteries between uses to extend the lifetime of the dual vaporizer battery device. In the shown embodiment, the charging port 28 comprises a micro-USB port, however, alternate port structures capable of operably connecting the first and second batteries with an external power source are also contemplated. Furthermore, in the shown embodiment, the placement of the charging ports 28 on the first end 13 and the proximal end 16 disguise the presence of the charging ports 28 when the dual vaporizer battery device is in the linear configuration, increasing aesthetic appeal of the device. Similarly, in an alternate embodiment, the charging port 28 is contemplated to be disposed within each of the second end 14 and the distal end 17, such that the vaporizer housing hides the charging port 28 when the device is in use. Alternatively, a charging port 28 may be optionally disposed on both ends of each battery housing, such that the user can readily recharging the first and second batteries in either the linear or parallel configurations.

A connector 21 is disposed on each of the second end 14 and the distal end 17 of the first and second battery housings, respectively, wherein the connectors 21 are configured to removably secure a vaporizer housing thereto. In the shown embodiment of FIG. 28, each connector 21 comprises a depression having threading on an interior surface of the connector 21 to removably secure complementary threading disposed on an exterior of a base (as shown in FIG. 4, 29) of each vaporizer housing. The connectors 21 are further contemplated to electrically couple the first and second batteries to electronic components within each vaporizer housing, such as heating elements (as shown in FIG. 3, 25) to vaporize fluid disposed within each vaporizer cartridge (as shown in FIG. 3, 27). In alternate embodiments, the vaporizer housings are contemplated to removably secure to the connectors 21 via frictional engagement, latches, or other securement means. In the shown embodiment, a central aperture is disposed within each connector 21, wherein the central aperture is configured to operably connect an associated vaporizer housing with a pressure sensor (as shown in FIG. 3, 24) configured to detect when a user inhales via a mouthpiece (as shown in FIG. 4, 26) of the vaporizer housing. Once the pressure sensor detects a user's inhalation, power is directed from one of the first and second batteries to the heating element of the vaporizer cartridge to vaporize the fluid within the cartridge. As such, the lifetime of each of the first and second batteries is extended, as power is only transferred when the user inhales via the mouthpiece.

Referring now to FIG. 3, there is shown a schematic view of an embodiment of the dual vaporizer battery device. In the shown embodiment, the first battery housing 12 comprises a first battery 18 therein operably connected to each of a charging port 28 and a pressure sensor 24 and the second battery housing 15 comprises a second battery 19 operably connected to each of a charging port 28 and a pressure sensor 24. As previously discussed, the charging port 28 is contemplated to electrically connect the first and second batteries 18, 19 with an external power source to allow the user to recharge each of the first and second batteries 18, 19 between uses. The first and second battery housings 12, 15 are each contemplated to removably secure the vaporizer housing 22 thereto, wherein the vaporizer housing 22 is operably connected to the first and second batteries 18, 19, respectively. In this manner, the first and second batteries 18, 19 are in operably communication with the heating elements 25 disposed within each vaporizer housing 22 to facilitate vaporizing the fluid disposed within a cartridge 27 of each vaporizer housing 22. In the shown embodiment, a pressure sensor 24 is disposed within each of the first and second battery housings 12, 15, wherein the pressure sensor 24 is configured to detect when a suction force is applied to the associated vaporizer housing 22. In this manner, the pressure sensor 24 is contemplated to close a circuit upon detection of the suction force, such that the first and second batteries 18, 19 transfer power to the heating elements 25 upon detection of the suction force. As such, energy stored within each of the first and second batteries 18, 19 is extended as energy is only drawn upon detection of the suction force, indicating the inhalation of the user upon one of the vaporizer housings 22.

Referring now to FIG. 4, there is shown an exploded view of an embodiment of the dual vaporizer battery device with associated vaporizer housings. In the illustrated embodiment, each vaporizer housing 22 removably securable to the dual vaporizer battery device 11 comprises a base 29 removably securable to the connectors disposed on the second end 14 and the distal end 17 of the first and second battery housings, respectively. As previously described, the base 29 is contemplated to comprise threading complementary to the threading disposed within the connector, such that the vaporizer housing 22 is securely affixed to the dual vaporizer battery device 11. A cartridge 27 is disposed within each vaporizer housing 22, wherein the cartridge 27 comprises a vaporizer fluid therein. The vaporizer fluid is configured to evaporate upon actuation of the heating element within the vaporizer housing 22. A mouthpiece 26 is disposed opposite the base 29, wherein the mouthpiece 26 is in fluid communication with the cartridge 27 facilitating the inhalation of the vaporized fluid. In the illustrated embodiment, the vaporizer housings 22 taper radially inwardly from the base 29 to the mouthpiece 26, such that the mouthpiece 26 comprises a smaller diameter than the base 29 to comfortably fit within the user's mouth. In some embodiments, the vaporizer housing 22 includes the aforementioned pressure sensor therein, such that upon detection of inhalation at the mouthpiece 26, the vaporizer housing 22 draws power from one of the first and second batteries via the connector to actuate the heating element to instantly vaporize fluid within the cartridge. In this manner, in some embodiments, the vaporizer housing 22 is contemplated to comprise an existing standalone vaporizer system to allow the dual vaporizer battery device 11 to operate with a variety of existing vaporizer systems.

In one use, the dual vaporizer battery device 11 can be utilized with a pair of distinct vaporizer housings 22, wherein the pair of vaporizer housings 22 are contemplated to each include a distinct vaporizer fluid flavor or type as desired. In this manner, the user can readily inhale vaporizer fluids of different flavors without replacing the cartridge 27 or requiring a separate device. When the user wishes to utilize a single vaporizer housing 22, the user can pivot the dual vaporizer battery device 11 about the hinge 20 to the linear configuration to independently inhale vapor produced by a single vaporizer housing 22. Alternatively, when the user wishes to simultaneously inhale two distinct vapors, the user can pivot the dual vaporizer battery device 11 about the hinge 20 to the parallel configuration, wherein the first and second battery housings abut each other along an entire length thereof. In this configuration, the vaporizer housings 22 are disposed adjacent and parallel to each other, allowing a user to inhale simultaneously from both mouthpieces 26. In this manner, the user can mix and match multiple vaporizer fluid flavors to create a desirable combination flavor. Additionally, when in the parallel configuration, the dual vaporizer battery device 11 comprises a smaller form factor facilitating transport and storage of the device. As such, the user is provided with an efficient means to access two distinct vaporizer fluids separately or simultaneously.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly, and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:
1. A dual vaporizer battery device, comprising:
 a first battery housing having a first end opposite a second end;
 a second battery housing having a proximal end opposite a distal end;
 wherein a first battery is disposed within the first battery housing and a second battery is disposed within the second battery housing;
 wherein the first end of the first battery housing is pivotally affixed to the proximal end of the second battery housing via a hinge;
 wherein the first battery housing is selectively movable relative to the second battery housing between a linear configuration and a parallel configuration;
 wherein the first battery housing is coaxially disposed relative to the second battery housing when in the linear configuration;
 wherein a connector is disposed on each of the second end and the distal end;
 wherein each connector is configured to removably secure a vaporizer housing thereto, such that the vaporizer housing is in operable communication with one of the first battery and the second battery.
2. The dual vaporizer battery device of claim 1, wherein the connector comprises a threaded interface configured to engage complementary threading disposed on a base of each vaporizer housing.
3. The dual vaporizer battery device of claim 1, wherein a magnet is disposed within each of the first end and the proximal end, such that the first end is magnetically secured to the proximal end when in the linear configuration.

4. The dual vaporizer battery device of claim 1, wherein the hinge comprises a cylindrical hinge.

5. The dual vaporizer battery device of claim 1, wherein the first battery housing abuts the second battery housing along an entire length thereof when in the parallel configuration.

6. The dual vaporizer battery device of claim 1, wherein the connector includes a pressure sensor configured to transfer power to a heating element of the vaporizer housing upon detection of suction at a mouthpiece of the vaporizer housing.

7. The dual vaporizer battery device of claim 1, further comprising a charging port disposed on each of the first battery housing and the second battery housing, wherein each charging port is in electrical communication with one of the first battery and the second battery.

8. The dual vaporizer battery device of claim 7, wherein the charging port is disposed on each of the second end and the distal end, such that the user can selectively affix a charging device to the connector to provide power to the first battery and the second battery.

9. The dual vaporizer battery device of claim 7, wherein the charging port is disposed on each of the proximal end and the first end.

10. The dual vaporizer battery device of claim 7, wherein the charging port comprises a micro-USB port.

11. A dual vaporizer battery device, comprising:
a first battery housing having a first end opposite a second end;
a second battery housing having a proximal end opposite a distal end;
wherein a first battery is disposed within the first battery housing and a second battery is disposed within the second battery housing;
wherein the first end of the first battery housing is pivotally affixed to the proximal end of the second battery housing via a hinge;
wherein the first battery housing is selectively movable relative to the second battery housing between a linear configuration and a parallel configuration;
wherein the first battery housing is coaxially disposed relative to the second battery housing when in the linear configuration;
a first vaporizer housing having a first cartridge operably connected to a first heating element and a first mouthpiece;
a second vaporizer housing having a second cartridge operably connected to a second heating element and a second mouthpiece;
wherein a connector is disposed on each of the second end and the distal end;
wherein each connector is configured to removably secure one of the first vaporizer housing and the second vaporizer housing thereto, such that each vaporizer housing is in operable communication with one of the first battery and the second battery.

12. The dual vaporizer battery device of claim 11, wherein the connector comprises a threaded interface configurated to engage complementary threading disposed on a base of each of the first and second vaporizer housings.

13. The dual vaporizer battery device of claim 11, wherein a magnet is disposed within each of the first end and the proximal end, such that the first end is magnetically secured to the proximal end when in the linear configuration.

14. The dual vaporizer battery device of claim 11, wherein the hinge comprises a cylindrical hinge.

15. The dual vaporizer battery device of claim 11, wherein the first battery housing abuts the second battery housing along an entire length thereof when in the parallel configuration.

16. The dual vaporizer battery device of claim 11, wherein the connector includes a pressure sensor configured to transfer power to a heating element of the vaporizer housing upon detection of suction at a mouthpiece of the vaporizer housing.

17. The dual vaporizer battery device of claim 11, further comprising a charging port disposed on each of the first battery housing and the second battery housing, wherein each charging port is in electrical communication with one of the first battery and the second battery.

18. The dual vaporizer battery device of claim 17, wherein the charging port is disposed on each of the second end and the distal end, such that the user can selectively affix a charging device to the connector to provide power to the first battery and the second battery.

19. The dual vaporizer battery device of claim 17, wherein the charging port is disposed on each of the proximal end and the first end.

20. The dual vaporizer battery device of claim 17, wherein the charging port comprises a micro-USB port.

* * * * *